US008885480B2

(12) United States Patent
Snyder, II et al.

(10) Patent No.: US 8,885,480 B2
(45) Date of Patent: Nov. 11, 2014

(54) PACKET PRIORITY IN A NETWORK PROCESSOR

(75) Inventors: Wilson P. Snyder, II, Holliston, MA (US); Daniel A. Katz, Holliston, MA (US); Richard E. Kessler, Northborough, MA (US); Srikanth Gummalla, Marlborough, MA (US)

(73) Assignee: Cavium, Inc., San Jose, CA (US)

( * ) Notice: Subject to any disclaimer, the term of this patent is extended or adjusted under 35 U.S.C. 154(b) by 491 days.

(21) Appl. No.: 13/277,613

(22) Filed: Oct. 20, 2011

(65) Prior Publication Data

US 2013/0100812 A1 Apr. 25, 2013

(51) Int. Cl.
H04L 1/00 (2006.01)
H04L 12/931 (2013.01)
H04L 12/825 (2013.01)

(52) U.S. Cl.
CPC ............ H04L 49/205 (2013.01); H04L 49/505 (2013.01); H04L 47/263 (2013.01)
USPC .......................................................... 370/236

(58) Field of Classification Search
CPC .... H04L 49/505; H04L 49/506; H04L 47/263
USPC ................................................ 370/236, 252
See application file for complete search history.

(56) References Cited

U.S. PATENT DOCUMENTS 7,031,306 B2 * 4/2006 Amaral et al. ................ 370/389
2010/0191911 A1 * 7/2010 Heddes et al. ................ 711/118

OTHER PUBLICATIONS

"Cavium Networks Unveils OCTEON II CN68XX—Industry's Highest-Performance Multi-Core Processors for Energy-Efficient Data Center, Mobile Internet and the Borderless Enterprise" (May 10, 2010).

* cited by examiner

Primary Examiner — Man Phan
Assistant Examiner — Kevin Lee
(74) Attorney, Agent, or Firm — Hamilton, Brook, Smith & Reynolds, P.C.

(57) ABSTRACT

In a network processor, a "port-kind" identifier (ID) is assigned to each port. Parsing circuitry employs the port-kind ID to select the configuration information associate with a received packet. The port kind ID can also be stored at a data structure presented to software, along with a larger port number (indicating an interface and/or channel). Based on the port kind ID and extracted information about the packet, a backpressure ID is calculated for the packet. The backpressure ID is implemented to assign a priority to the packet, as well as determine whether a traffic threshold is exceeded, thereby enabling a backpressure signal to limit packet traffic associated with the particular backpressure ID.

8 Claims, 4 Drawing Sheets

US 8,885,480 B2

PACKET PRIORITY IN A NETWORK PROCESSOR

BACKGROUND

Typical network processors schedule and queue work such as packet processing operations for upper level network protocols, and allow processing with respect to upper level network protocols (e.g., transport and application layers) in received packets before forwarding the packets to connected devices. The functions typically performed by network processors include packet filtering, queue management and priority, quality of service enforcement, and access control. By employing features specific to processing packet data, network processors can optimize an interface of a networked device.

SUMMARY

Embodiments of the present invention provide a method of processing packets in a network processor circuit. A packet and a port identifier (ID) are received from a network interface, where the port ID indicates a channel associated with the packet. The channel is a subset of communications at the network interface. The port ID is compared against entries in a table to determine instructions for processing the packet, the table storing a number of port IDs with corresponding instructions. Further, the port ID and information regarding the packet, which may be extracted from the packet itself, are used to determine a backpressure ID. The backpressure ID is provided to a resource counter, which increments in accordance with the backpressure ID, thereby maintaining a count of the packets or packet data received on a per-port ID basis. If the resource counter meets or exceeds a threshold, it may indicate an excess of packet traffic at a particular channel. In response, a backpressure control signal is transmitted to the network interface to limit operation of the channel.

In further embodiments, the information regarding the packet used to determine the backpressure ID can be the packet data itself. Such packet data can include a VLAN tag, a HiGig tag, a DSA tag, a diffserv tag, or a packet instruction header. A priority can also be assigned to the packet based on the backpressure ID. Further, the backpressure control signal can cause a network interface to limit packet transmission to the network interface.

In still further embodiments, a system for processing packets can include an input port for receiving packets from a plurality of network interfaces. Each of the packets have an associated port identifier (ID), the port ID indicating a channel associated with the packet. The channel is a subset of communications at the network interface. A parsing circuit operates to compare the port ID against entries in a table to determine instructions for processing the packet, the table storing a plurality of port IDs with corresponding instructions. The parsing circuit further determines a backpressure ID based on the port ID and information regarding the packet. A backpressure control circuit increments a resource counter corresponding to the backpressure ID. In response to detecting the resource counter reaching a threshold, the backpressure control circuit sends a control signal to the respective network interface to limit operation of the channel.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Before describing example embodiments of the present invention in detail, an example network security processor in which the embodiments may be implemented is described immediately below to help the reader understand the inventive features of the present invention.

Figure 1:
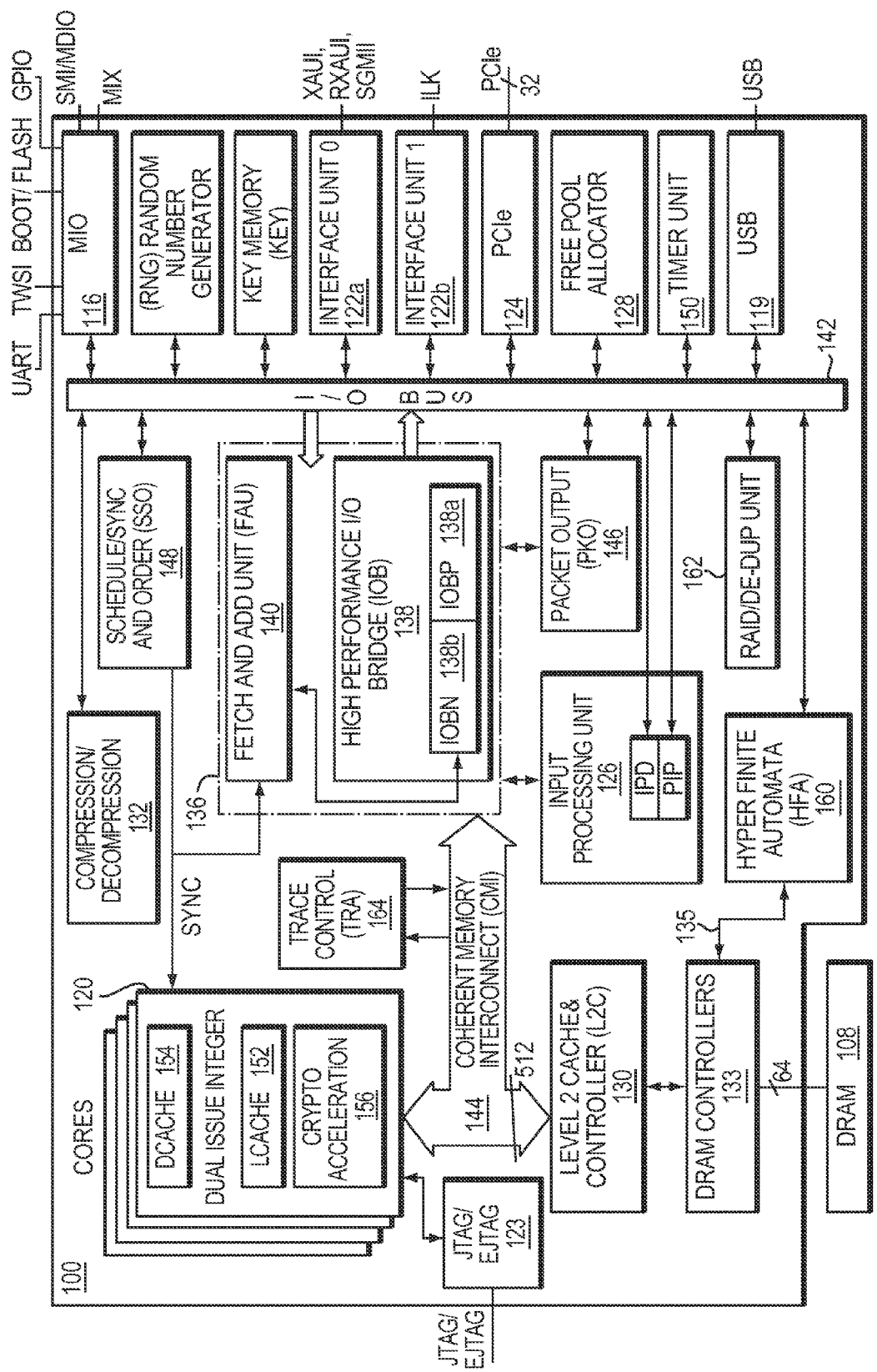
FIG. 1 is a block diagram illustrating a network services processor in which embodiments of the present invention may be implemented.

FIG. 1 is a block diagram illustrating a network services processor 100. The network services processor 100 delivers high application performance using at least one processor core 120.

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122. A packet can also be received by a PCI interface 124. The interface unit 122 performs pre-processing of the received packet by checking various fields in the L2 network protocol header included in the received packet and then forwards the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122b can receive connections from an Interlaken Interface (ILK).

The packet input unit 126 performs further pre-processing of network protocol headers (e.g., L3 and L4 headers)

included in the received packet. The pre-processing includes checksum checks for TCP/User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache 130 or external DRAM 108. Preferably, the packet data is written into the buffers in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA thread engines adapted to accelerate pattern and/or signature matching necessary for anti-virus, intrusion-detection systems and other content-processing applications. Using a HFA unit 160, pattern and/or signature matching is accelerated, for example being performed at rates upwards of multiples of tens of gigabits per second. The HFA unit 160, in some embodiments, could include any of a Deterministic Finite Automata (DFA), Non-deterministic Finite Automata (NFA), or HFA algorithm unit.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138*a* and an I/O Bus Bridge (IOBN) 138*b*. The I/O Packet Bridge 138*a* is configured to manage the overall protocol and arbitration and provide coherent I/O portioning with primarily packet input and output. The I/O Bus Bridge 138*b* is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 802 two-wire Management Data I/O (MDIO), Serial Management Interface (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services provider 100 may also include a Joint Test Action Group ("JTAG") Interface 123 supporting the MIPS EJTAG standard. According to the JTAG and MIPS EJTAG standards, a plurality of cores within the network services provider 100 will each have an internal Test Access Port ("TAP") controller. This allows multi-core debug support of the network services provider 100.

A Schedule/Sync and Order (SSO) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto-acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 120, the I/O interface 136 and the Level-2 cache memory 130 and controller. In one embodiment, the CMI 144 is scalable to 32 processor cores 120, supporting fully-coherent Level-1 data caches 154 with write through. Preferably the CMI 144 is highly-buffered with the ability to prioritize I/O. The CMI is coupled to a trace control unit 164 configured capture bus request so software can later read the request and generate a trace of the sequence of events on the CMI.

The Level-2 cache memory controller 131 maintains memory reference coherence. It returns the latest copy of a block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers supporting 32 gigabytes of DRAM. Preferably, each DRAM controller 133 supports a 64-bit interface to DRAM 108. Additionally, the DRAM controller 133 can supports preferred protocols, such as the DDR-III protocol.

After a packet has been processed by the processor cores 120, the packet output unit 146 reads the packet data from the Level-2 cache memory 130, DRAM 108, performs L4 network protocol post-processing (e.g., generates a TCP/UDP checksum), forwards the packet through the interface units 122 or the PCI interface 124 and frees the L2 cache memory 130/DRAM 108 used by the packet.

The DRAM Controllers 133 manages in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The DFA unit 160 is coupled directly to the DRAM Controllers 133 on a bypass-cache access path 135. The bypass-cache access path 135 allows the HFA Unit to read directly from the memory without using the Level-2 cache memory 130, which can improve efficiency for HFA operations.

A network processor 100 may implement the input processing unit 126, including a common buffering and parser block (PIP/IPD), to perform parsing of a received packet. The input processing block 126 may parse the packet to extract network specific L2-L7 fields, classify the packet according to those fields and configuration, determine RED (random early discard) packet admission and backpressure, and divide the packet into segments for storing into the L2 cache and memory system. Previous network processors have initialized parsing information with configuration information on a per-interface or per-port (portion of an interface) basis. Thus, with reference to the network processor 100, XAUI port 0 at interface unit 122a would be assigned a first configuration, while XAUI port 1 would be assigned a second configuration, and additional ports would likewise have independent configurations. Under such a scheme, when inbound packet data is received to the network processor too quickly, and backpressure is to be asserted, the backpressure would be sent back to one specific port.

This previous approach had at least two drawbacks. First, interfaces such as Interlaken can have many channels (256). To apply configurations on a per-port (i.e., channel) basis, resources would be required for thousands of ports and therefore thousands of configuration blocks, as well as thousands of backpressure control wires, resulting in expensive and inflexible circuitry. Due to differences in products and applications, all ports at the network processor are likely never used simultaneously, and dedicating resources to each may therefore be wasteful.

Example embodiments of the present invention provide for a "port-kind" identifier (ID) that is assigned to each port independent of the port's respective interface, where multiple ports from one or more interfaces may be assigned a common port kind ID, and a port may be assigned to multiple port-kind IDs. The port kind ID may be held at each interface, and may be passed with each received packet to the common buffering and parser block (PIP/IPD). The parser block then uses the port-kind ID to select the configuration information associate with the packet. The port kind ID can also be stored at a data structure presented to software, along with a larger port number (indicating an interface and/or channel). Further, statistics and other expensive resources in PIP/IPD are indexed by port-kind. This enables the application designer to allocate these resources to ports in any desired configuration.

In the PIP/IPD circuit a backpressure ID (BPID) may be calculated for the packet. This calculation may include the physical interface the packet came from, the channel of the interface, the port, the port-kind as described above, and/or various information present in the data in the packet, such as VLAN tags, HiGig or DSA tags.

When inbound data is received too quickly and the system needs to slow or halt a subset of packet traffic (i.e., provide backpressure), a wire (logical or physical) corresponding to the BPID asserts. Each port is assigned a BPID; when the assigned backpressure ID wire is asserted, that port signals backpressure over its interface to the interface's transmitter. Similar to port-kinds, this assignment of BPIDs enables the application to share physical resources between ports, and/or assert backpressure on many ports simultaneously. The packet's BPID may also be saved into a data structure presented to software managing the network processor; the software may use the BPID to control backpressure or determine if backpressure is asserted.

Further, the PIP/IPD circuit may utilize contents of a packet, as well as the initial port configuration, to determine the packet's BPID. Incoming packets on the same port can be configured to extract various information present in the data in the packet, such as VLAN tags, HiGig or DSA tags, diffserv tags, and packet instruction header. The BPID can then be used to prioritize the individual packet. The PIP/IPD circuit can perform this extraction of packet information for all received packets, thereby centralizing this function within the network processor, rather than separately implementing the extraction in each network interface. As a result, the overall circuit layout footprint is reduced, the features of the PIP/IPD circuit can be scaled as network interfaces are added or removed, and the validation effort is localized.

Embodiments of the present invention may be implemented in the network services processor 100 shown in FIG. 1, and may be directed more particularly to the input processing unit 126, as well as the common buffering and parser block (PIP/IPD) operated therein. Example embodiments are described in further detail below with reference to FIGS. 2-4.

Figure 2:
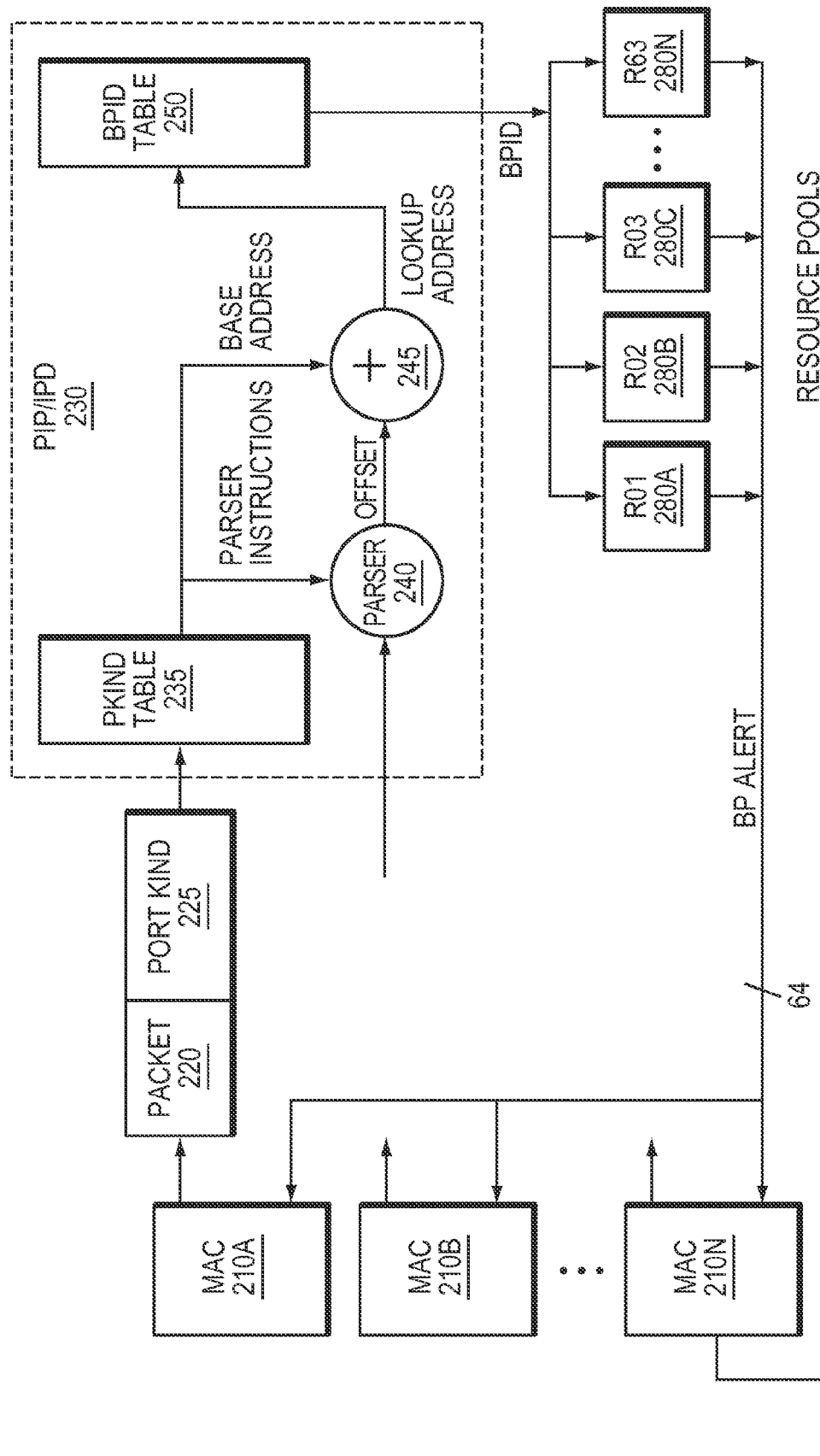
FIG. 2 is a block diagram of a common buffering and parser block (PIP/IDP) circuit and associated components in one embodiment.

FIG. 2 is a block diagram of a common buffering and parser block (PIP/IPD) circuit 230 and associated components of a network processor in one embodiment. A plurality of network interfaces 210A-N (e.g., interface units 122 of the network processor 100 in FIG. 1) forward packets to the PIP/IPD circuit 230. A received packet 220 is accompanied by a respective port kind ID 225. Upon receipt of the packet 220 and port kind ID 225 to the PIP/IPD circuit 230, a port kind table 235 compares the port kind ID against the entries in the table. The port kind table 235 may store entries for each of the port kind IDs in use, and may further store corresponding entries for configuration information, thereby indicating how the packet 220 is to be processed based on its port kind ID 225. Configuration information can include information on which fields are present and to be extracted from the packet, specific errors to check for, instructions to compute checksums, and which cores are to receive the packet or further processing. The port kind table 235 outputs these instructions to the parser unit 240. The parser 240 receives the packet 220 and, based on the received parser instruction, outputs an offset. Offset may be calculated from fields in the packet, such as the VLAN tag. VLAN or DSA tags can then be used to control backpressure on virtual channels determined by those fields. A combiner unit 245 combines the port kind ID ("base address") with the offset derived from the parser instructions to output a lookup address for the backpressure ID. The BPID table 250 may store entries for each of the backpressure IDs assigned to the ports of the network interfaces 210A-N, as well as one or more corresponding lookup addresses for each backpressure ID. The BPID table 250 thus provides the calculated backpressure ID for the packet 220.

The PIP/IPD circuit 230 outputs the resulting backpressure ID to the resource pools 280A-N, which can be located at (or integral to) the PIP/IPD circuit 230. Each backpressure ID is associated with a different resource pool 280A-N, and though the backpressure ID may be received at all of the resource pool 280A-N, only the resource pool 280A-N associated with that backpressure ID is responsive to the backpressure ID. For the packets associated with its backpressure ID, each resource pool 280A-N may include a counter configured to track the quantity and/or total byte size of those packets that are currently being processed (e.g., received at the network processor and not yet cleared). Depending on a determined configuration for the given port-kind ID, the counter can increment on a per-packet basis, or can increment a value relative to the packet size. This configuration may be stored at the free pool allocator 128 shown in FIG. 1. Each resource pool 280A-N may further include a threshold specifying a total count of packets, a total byte count of the packets, or both. When the threshold is exceeded, a resource pool (e.g., resource pool 280A) outputs a backpressure alert, which is received by the particular network interfaces(s) 210A-N having ports associated with backpressure ID of the resource pool 280A. In response to the backpressure alert, the network interface(s) 210A-N may operate to limit or temporarily halt packet traffic at the respective port. To accomplish this, the network interfaces 210A-N may transmit a priority-based flow control (PFC) pause packet upstream on the respective channel to the networked device (not shown), thereby signaling to the networked device to limit or halt packet traffic at the respective port.

Figure 3:
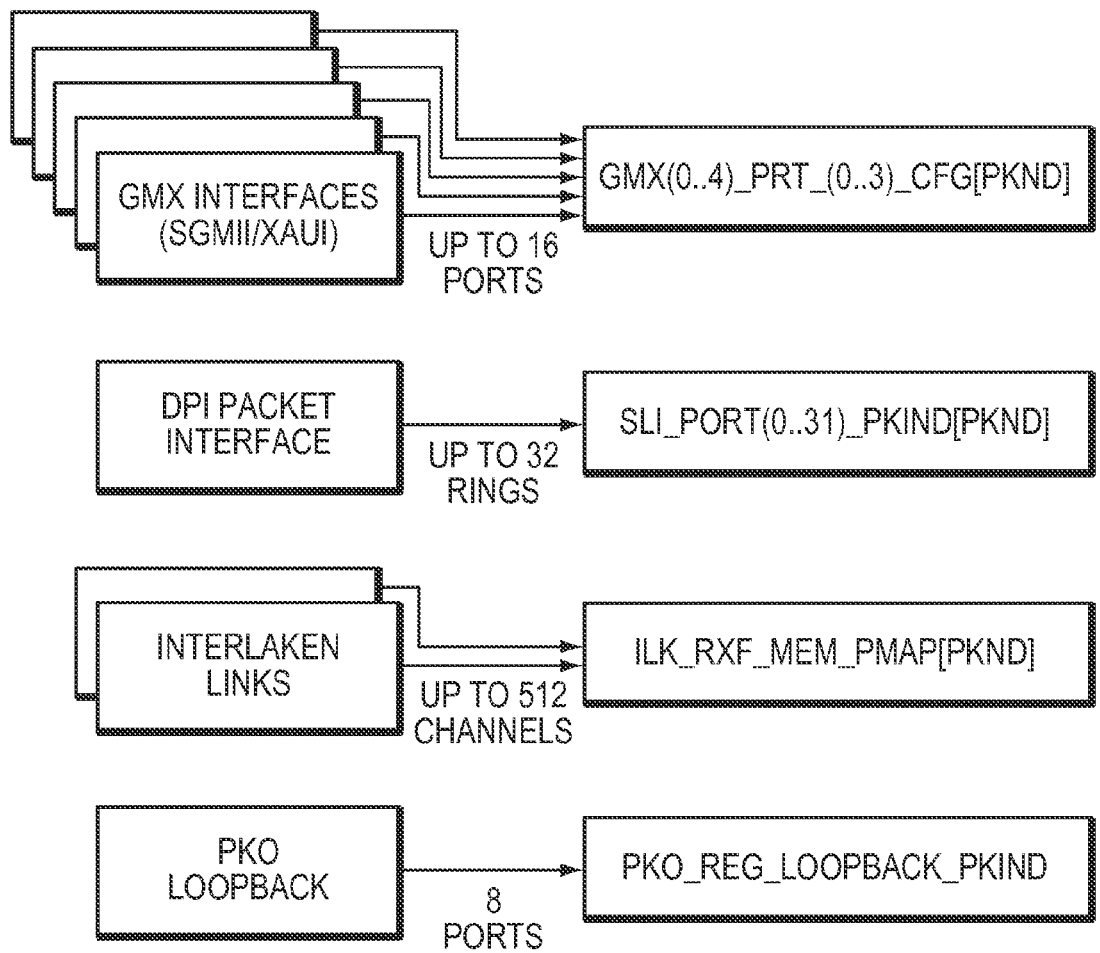
FIG. 3 is a block diagram illustrating example port-kind designations for different packet interfaces in one embodiment.

FIG. 3 is a block diagram illustrating example port-kind designations for different packet interfaces in one embodiment. The packet interfaces include GMX interfaces having a number of ports, a DPI interface having a number of rings, Interlaken links having a number of channels, and a PKO loopback interface having a number of ports. Although each of the interfaces implements a different packet link, all can be represented by port kind IDs for the purposes of traffic control.

Figure 4:
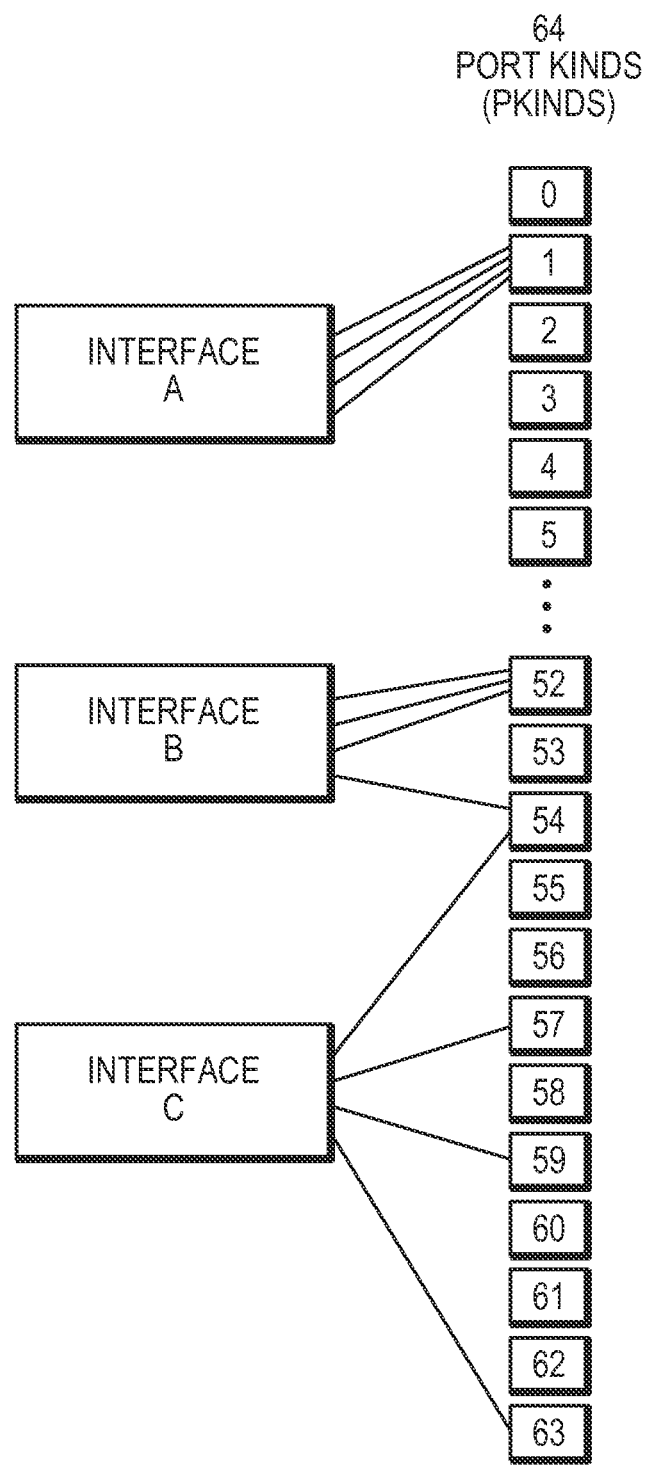
FIG. 4 is a block diagram illustrating example mappings of interfaces to respective port-kinds in one embodiment.

FIG. 4 is a block diagram illustrating example mappings of interfaces to respective port-kinds in one embodiment. Packet traffic from a plurality of interfaces can be divided and assigned to port kind IDs independent of the interface or the channel providing the traffic. Here, interfaces A, B and C each receive packets at a number of channels (i.e., "ports," "rings" or "channels," depending on the configuration of that interface). For the purposes of backpressure control and packet priority, each of the channels is to be mapped to a port kind ID (e.g., port kind IDs 0-63). For interface A, multiple channels are mapped to a single port kind ID (1). For interface B, multiple channels are also mapped to a single port kind ID (52), but a single channel is also mapped to another port kind ID (54). In contrast, the channels of interface C are each mapped to a different port kind ID (54, 57, 59, 63), one of which is shared with a channel of interface B.

While this invention has been particularly shown and described with references to example embodiments thereof, it will be understood by those skilled in the art that various changes in form and details may be made therein without departing from the scope of the invention encompassed by the appended claims.

What is claimed is:

1. A method of processing packets comprising:
   receiving, from a network interface, a packet and a port identifier (ID), the port ID indicating a channel associated with the packet, the channel being a subset of communications at the network interface;
   comparing the port ID against entries in a table to determine instructions for processing the packet, the table storing a plurality of port IDs with corresponding instructions;
   determining a backpressure ID based on the port ID and information regarding the packet;
   incrementing a resource counter corresponding to the backpressure ID; and
   in response to detecting the resource counter reaching a threshold, sending a control signal to the network interface to limit operation of the channel;
   assigning a priority to the packet based on the backpressure ID.

2. The method of claim 1, wherein the information regarding the packet includes packet data.

3. The method of claim 2, wherein the packet data includes one or more of a Virtual Local Area Network (VLAN) tag, HiGig tag, Digital Signature Algorithm (DSA) tag, Differentiated Services (diffserv) tag, a packet instruction header, and a customer configured custom field from the packet.

4. The method of claim 1, wherein the control signal is configured to cause a network element upstream from the network interface to limit packet transmission to the network interface.

5. An apparatus comprising:
   an input port for receiving packets from a plurality of network interfaces, each of the packets having an associated port identifier (ID), the port ID indicating a channel associated with the packet, the channel being a subset of communications at the network interface;
   a parsing circuit configured to 1) compare the port ID against entries in a table to determine instructions for processing the packet, the table storing a plurality of port IDs with corresponding instructions, 2) determine a backpressure ID based on the port ID and information regarding the packet, and 3) assigns a priority to the packet based on the backpressure ID; and
   a backpressure control circuit configured to increment a resource counter corresponding to the backpressure ID and, in response to detecting the resource counter reaching a threshold, send a control signal to the respective network interface to limit operation of the channel.

6. The apparatus of claim 5, wherein the information regarding the packet includes packet data.

7. The apparatus of claim 6, wherein the packet data includes one or more of a Virtual Local Area Network (VLAN) tag, HiGig tag, Digital Signature Algorithm (DSA) tag, Differentiated Services (diffserv) tag, a packet instruction header, and a customer configured custom field from the packet.

8. The apparatus of claim 5, wherein the control signal is configured to cause a network element upstream from the network interface to limit packet transmission to the network interface.

* * * * *